(12) United States Patent
Liu et al.

(10) Patent No.: US 11,399,317 B2
(45) Date of Patent: Jul. 26, 2022

(54) CELL RESELECTION METHOD AND DEVICE, CLOSED SUBSCRIBER GROUP VERIFICATION METHOD AND DEVICE, AND STORAGE MEDIUM

(71) Applicant: ZTE CORPORATION, Guangdong (CN)

(72) Inventors: Xu Liu, Guangdong (CN); Bo Dai, Guangdong (CN); Xiubin Sha, Guangdong (CN); Ting Lu, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 202 days.

(21) Appl. No.: 16/637,852

(22) PCT Filed: Jul. 23, 2018

(86) PCT No.: PCT/CN2018/096604
§ 371 (c)(1),
(2) Date: Feb. 10, 2020

(87) PCT Pub. No.: WO2019/029347
PCT Pub. Date: Feb. 14, 2019

(65) Prior Publication Data
US 2020/0252840 A1 Aug. 6, 2020

(30) Foreign Application Priority Data
Aug. 10, 2017 (CN) .......................... 201710682022.4

(51) Int. Cl.
*H04W 36/00* (2009.01)
(52) U.S. Cl.
CPC . *H04W 36/0038* (2013.01); *H04W 36/00835* (2018.08)

(58) Field of Classification Search
CPC ....... H04W 36/0038; H04W 36/00835; H04W 48/20; H04W 36/08; H04L 63/104; Y02D 30/70
See application file for complete search history.

(56) References Cited

U.S. PATENT DOCUMENTS

| | | | |
|---|---|---|---|
| 2009/0238117 | A1 | 9/2009 | Somasundaram et al. |
| 2009/0239533 | A1 | 9/2009 | Somasundaram et al. |

(Continued)

FOREIGN PATENT DOCUMENTS

| | | |
|---|---|---|
| CN | 101883347 A | 11/2010 |
| CN | 101932076 A | 12/2010 |

(Continued)

OTHER PUBLICATIONS

European Search Report and Written Opinion for the European U.S. Appl. No. 18/843,841, dated Apr. 7, 2021, 21 pages.

(Continued)

*Primary Examiner* — Christine Ng
(74) *Attorney, Agent, or Firm* — KDB Firm PLLC

(57) ABSTRACT

Provided are a cell reselection method and device, a closed subscriber group (CSG) verification method and device, and a storage medium. The cell reselection method includes: a user equipment (UE) acquiring CSG information of a neighboring cell from a network side; and the UE determining a cell allowing access according to the acquired CSG information of the neighboring cell. The CSG verification method includes: after access of a UE having a CSG subscription attribute, a base station reporting CSG verification information of a serving cell and a neighboring cell of the UE to a mobility management entity (MME); and the base station acquiring CSG verification result information of the UE from the MME and storing the CSG verification result information, where the CSG verification result information is acquired by the MME through completing CSG verifica- (Continued)

tion of the UE in the serving cell and the neighboring cell according to the CSG verification information reported by the base station and subscription information of the UE acquired from a network side. The solution can reduce power consumption of a UE.

9 Claims, 7 Drawing Sheets

(56) References Cited

U.S. PATENT DOCUMENTS

| | | | |
|---|---|---|---|
| 2010/0112980 A1* | 5/2010 | Horn | H04W 48/20 455/411 |
| 2010/0178941 A1* | 7/2010 | Chun | H04L 1/1832 455/458 |
| 2011/0105123 A1 | 5/2011 | Lee et al. | |
| 2012/0108239 A1* | 5/2012 | Damnjanovic | H04W 24/10 455/436 |
| 2012/0142346 A1* | 6/2012 | Nakata | H04W 48/12 455/435.1 |
| 2012/0190363 A1 | 7/2012 | Maeda et al. | |
| 2014/0187246 A1* | 7/2014 | Jha | H04L 5/0098 455/436 |
| 2014/0228030 A1 | 8/2014 | Jung et al. | |
| 2015/0087268 A1* | 3/2015 | Bonneville | H04W 4/08 455/411 |
| 2015/0181482 A1 | 6/2015 | Jung et al. | |
| 2016/0353338 A1* | 12/2016 | Yamine | H04W 36/0061 |
| 2017/0181198 A1 | 6/2017 | Saraf | |

FOREIGN PATENT DOCUMENTS

| | | |
|---|---|---|
| CN | 102448108 A | 5/2012 |
| CN | 102573075 A | 7/2012 |
| CN | 104811917 A | 7/2015 |
| WO | 2011041748 A2 | 4/2011 |
| WO | 2013001054 A1 | 1/2013 |

OTHER PUBLICATIONS

Office Action for the Chinese Application No. 2017106820224, dated May 13, 2021, 5 pages.
Search Report for the Chinese Application No. 2017106820224, dated May 13, 2021, 2 pages.
International Search Report for the International Patent Application No. PCT/CN2018/096604, dated Oct. 15, 2018, 3 pages.
Second Office Action for the Chinese Patent Application No. 201710682022.4, dated Dec. 1, 2021, 7 pages.
Supplemental Search Report for the Chinese Patent Application No. 201710682022.4, dated Nov. 24, 2021, 3 pages.

* cited by examiner

//<sub>

CELL RESELECTION METHOD AND DEVICE, CLOSED SUBSCRIBER GROUP VERIFICATION METHOD AND DEVICE, AND STORAGE MEDIUM

CROSS-REFERENCES TO RELATED APPLICATIONS

This application is based upon and claims priority to a Chinese patent application No. 201710682022.4 filed on Aug. 10, 2017, the disclosure of which is incorporated herein by reference in its entirety.

TECHNICAL FIELD

The present application relates to communications and, in particular, to a cell reselection method and device, a closed subscriber group verification method and device, and a storage medium.

BACKGROUND

In the related art, a closed subscriber group (CSG) refers to a group of subscribed subscribers that are allowed to access one or more specific cells. A user equipment (UE) with a CSG attribute maintains an associated CSG identify (ID) list, where each CSG cell has a CSG ID, and a CSG ID of a current cell is broadcasted in a broadcast message. The UE determines whether a service cell allows access based on a CSG ID of the service cell and the maintained CSG ID list.

In the accessing process of a CSG cell, the CSG verification is bidirectional, that is, a core network also needs to verify the CSG attribute of the UE. An access mode of the CSG cell includes: an open mode, a close mode and a hybrid mode. All UEs can access a CSG cell in the open mode. Only UEs which are members of this CSG can access a CSG cell in the close mode. All UEs can access a CSG cell in the hybrid mode, but a priority of the UE which is a member of this CSG is higher than a priority of an ordinary UE. A mobility management entity (MME) determines whether this UE is a member of this CSG cell based on a CSG ID reported by a cell and access mode information as well as subscription information of the UE, so as to complete the CSG verification of the UE.

Information of the accessible CSG ID list maintained by the UE and the subscription information stored on a network side may be inconsistent, such as inconsistency caused by untimely update, which is a main reason why the CSG requires bidirectional verification. For UEs which are not members of this CSG cell, these UEs may reside in this CSG cell to acquire limited services (such as the notification of earthquake, tsunami, etc.), but if these UEs need to select and access an ideal cell, the power consumption of quality measurement and random access process in this CSG cell will be wasted.

SUMMARY

The present application provides a cell reselection method and device, a closed subscriber group verification method and device, and a storage medium to reduce power consumption of a UE.

Embodiments of the present application provide the following technical solutions.

A cell reselection method is provided. The method includes: acquiring, by a UE, CSG information of a neighboring cell from a network side; and determining, by the UE, a cell allowing access according to the acquired CSG information of the neighboring cell.

A cell reselection method is provided. The method includes: acquiring, by a base station, CSG information of a neighboring cell of a UE; and transmitting, by the base station, the CSG information of the neighboring cell of the UE to the UE for the UE to perform cell reselection.

A CSG verification method is provided. The method includes: after being accessed by a UE having a CSG subscription attribute, a base station reporting CSG verification information of a serving cell and a neighboring cell of the UE to an MME; and the base station acquiring CSG verification result information of the UE from the MME, and storing the CSG verification result information, where the CSG verification result information is acquired by the MME through completing CSG verification of the UE in the serving cell and the neighboring cell according to the CSG verification information reported by the base station and the subscription information of the UE acquired from a network side.

A cell reselection device is provided. The device includes a first processor and a first memory. The first processor is configured to store first executable instructions which, when executed by the first processor, perform the following operations: acquiring CSG information of a neighboring cell of a UE from a network side, and determining a cell to which the UE is to allowed to access according to the acquired CSG information of the neighboring cell.

A cell reselection device is provided. The device includes a second processor and a second memory. The second processor is configured to store second executable instructions which, when executed by the second processor, perform the following operations: acquiring CSG information of a neighboring cell of a UE, and transmitting the CSG information of the neighboring cell of the UE to the UE for the UE to perform cell reselection.

A CSG verification device is provided. The device includes: a third processor and a third memory. The third processor is configured to store third executable instructions which, when executed by the third processor, perform the following operations: after being accessed by a UE having a CSG subscription attribute, reporting CSG verification information of a serving cell and a neighboring cell of the UE to an MME, and acquiring CSG verification result information of the UE from the MME, and storing the CSG verification result information. The CSG verification result information is acquired by the MME through completing CSG verification of the UE in the serving cell and the neighboring cell according to the CSG verification information reported by a base station and subscription information of the UE acquired from a network side.

A cell reselection device is provided. The device includes a first acquisition module, which is configured to acquire CSG information of a neighboring cell of a UE from a network side; and a determination module, which is configured to determine a cell to which the UE is allowed to access according to the acquired CSG information of the neighboring cell.

A cell reselection device is provided. The device includes a second acquisition module and a transmission module. The second acquisition module is configured to acquire CSG information of a neighboring cell of a UE.

The transmission module is configured to transmit the CSG information of the neighboring cell of the UE to the UE for the UE to perform cell reselection.

A CSG verification device is provided. The device includes a reporting module and a storing module. The reporting module is configured to, after access of a UE having a CSG subscription attribute, report CSG verification information of a serving cell and a neighboring cell of the UE to an MME.

The storing module is configured to acquire CSG verification result information of the UE from the MME, and store the CSG verification result information. The CSG verification result information is acquired by the MME through completing CSG verification of the UE in the serving cell and the neighboring cell according to the CSG verification information reported by a base station and subscription information of the UE acquired from a network side.

A storage medium is provided. The storage medium includes stored programs which, when executed, perform the cell reselection method or the CSG verification method described above.

In at least one of the embodiments of the present application, by transmitting CSG information of a neighboring cell to the UE, a cell quality measurement range of the UE is optimized, thereby reducing power consumption of the UE.

In at least one of the embodiments of the present application, the base station triggers the MME to generate CSG verification result information and stores the CSG verification result information, so that the base station can perform CSG verification, thereby reducing the power consumption of the UE. In one implementation scheme of this embodiment, the base station can complete CSG verification of the UE or select a target cell for the UE based on the CSG verification result information, so as to reduce the power consumption of the UE.

Other features and advantages of the present application will be elaborated hereinafter in the description and, moreover, partially become apparent from the description, or will be understood through implementation of the present application. The object and other advantages of the present application may be achieved and obtained through structures set forth in the description, claims and drawings.

BRIEF DESCRIPTION OF DRAWINGS

The drawings are provided for a further understanding of the technical solutions of the present application, and constitute a part of the description. The drawings and the embodiments of the present application are used to explain the technical solutions of the present application, and not intended to limit the technical solutions of the present application.

DETAILED DESCRIPTION

Figure 1:
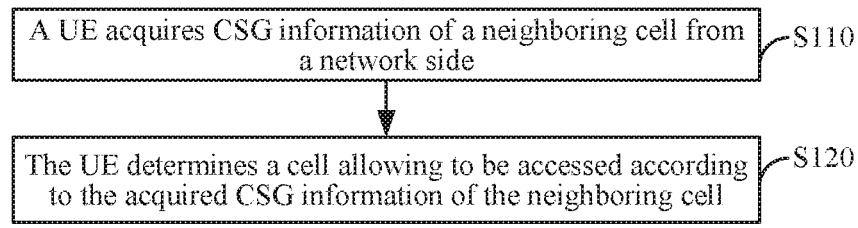
FIG. 1 is an optional processing flowchart of a cell reselection method according to an embodiment of the present disclosure.

The objects, technical solutions and advantages of the present application will be clearer from a detailed description of embodiments of the present application in conjunction with the drawings. It is to be noted that if not in collision, the embodiments and features therein in the present application may be combined with each other.

The steps illustrated in the flowcharts in the drawings may be performed by a computer system such as a group of computers capable of executing instructions. Further, although logical sequences are shown in the flowcharts, the shown or described steps may be performed in sequences different from those described herein in some cases.

The method mentioned in the present disclosure not only can used in a machine to machine (M2M) system, but also can be used in a cellular system such as Long Term Evolution (LTE) and New Radio (NR).

An optional processing procedure of a cell reselection method, as shown in FIG. 1, includes steps S110 and S120.

In step S110, a UE acquires CSG information of a neighboring cell from a network side.

In step S120, the UE determines a cell allowing access according to the acquired CSG information of the neighboring cell.

In the above step, the UE can use the determined cell allowing access as a target cell for cell quality measurement so as to complete cell reselection and subsequent cell access.

In one implementation scheme, the CSG information may include CSG attribute information of the neighboring cell, where the CSG attribute information is broadcasted by a base station.

The step S120 may include a step described below.

The UE determines the cell allowing access according to the acquired CSG attribute information of the neighboring cell and CSG list information maintained by the UE.

The CSG list maintained by the UE may include a CSG ID of the cell allowing access.

In this implementation scheme, if a CSG ID in CSG attribute information of a neighboring cell can be matched in the CSG list maintained by the UE (in other words, the CSG ID in CSG attribute information of a neighboring cell exists in the CSG list maintained by the UE), the UE regards this neighboring cell as the cell allowing access.

The CSG attribute information of the neighboring cell may include one or more of:

a CSG indication or a CSG ID of each cell of intra-frequency neighboring cells, a physical cell ID range (CSG-PhysCellIdrange) of the inter-frequency neighboring cell, or a CSG indication or a CSG ID of each cell of inter-frequency neighboring cells.

Adjacent base stations may exchange CSG attribute information of their cells. For example, if a base station has three cells, the base station transmits CSG attribute information of each of these three cells to an adjacent base station and acquires CSG attribute information of each cell of the adjacent base station transmitted by the adjacent base station. A current base station may transmit its cell's CSG attribute information to an adjacent base station or request CSG attribute information of each cell of the adjacent base station from the adjacent base station periodically or when a preset condition is met.

The base station may broadcast CSG attribute information of each of its cells, for example, including CSG attribute information of the three cells of the present base station and CSG attribute information of the cells of the adjacent base station. For the UE, the UE acquires CSG attribute information of multiple cells from a system message broadcasted by the base station, including CSG attribute information of a serving cell the UE currently accesses (referred to as the current cell hereinafter) and CSG attribute information of neighboring cells. During the reselection, the UE may omit the CSG attribute information of the serving cell, and determine a cell allowing access from among the neighboring cells merely according to the CSG attribute information of the neighboring cells.

In one implementation scheme, information on the CSG indication and the CSG ID of each cell of the intra-frequency neighboring cells may be added in an existing system information block type 4 (SIB4) message, and the CSG-PhysCellIdrange of the inter-frequency neighboring cell and information on the CSG indication and the CSG ID of each cell of the inter-frequency neighboring cells may be added in an SIB5 message, which includes the following:

(1) in an information element of the SIB4:

```
IntraFreqNeighCellInfo ::=    SEQUENCE is added with:
csg-Indication                  BOOLEAN,
    csg-Identity                    CSG-Identity        OPTIONAL
--Need OR;
```

(2) in an information element of the SIB5:

```
InterFreqNeighCellInfo ::=   SEQUENCE is added with:
csg-PhysCellIdRange             PhysCellIdRange
OPTIONAL,   -- Cond CSG;
InterFreqNeighCellInfo ::=      SEQUENCE is added with:
csg-Indication                  BOOLEAN,
csg-Identity            CSG-Identity        OPTIONAL -- Need OR.
```

An example of this implementation scheme is as follows.

A base station corresponding to a serving cell broadcasts CSG attribute information of a neighboring cell, including a CSG indication and a CSG ID of each cell of intra-frequency neighboring cells, a CSG-PhysCellIdrange of the inter-frequency neighboring cell, and a CSG indication and a CSG ID of each cell of inter-frequency neighboring cells.

When cell reselection is required, a UE determines a cell allowing access according to the CSG attribute information of the neighboring cell broadcasted by the base station and CSG list information maintained by the UE. If a CSG ID of a neighboring cell in a system message broadcasted by the base station can be matched in a CSG list maintained by the UE, this neighboring cell is regarded as the cell allowing access, and the UE may perform cell-reselection-related measurement for this neighboring cell.

If a UE residing in a CGS cell is under normal coverage, measurement of the inter-frequency neighboring cell may not be initiated, and only measurement of the intra-frequency neighboring cell is performed, that is, the UE merely determines the cell allowing access from among the intra-frequency neighboring cells.

In one implementation scheme, the CSG information may include CSG verification result information of the neighboring cell, where the CSG verification result information of the neighboring cell may be acquired by the MME through completing CSG verification of the UE in the neighboring cell according to CSG verification information reported by the base station and subscription information of the UE.

The S120 may include a step described below.

The UE determines the cell allowing access according to the acquired CSG verification result information of the neighboring cell and information of the neighboring cell broadcasted by the base station.

After the S110, the method may further include: storing, by the UE, the CSG verification result information of the neighboring cell in context information.

UE context information stored by a UE in an RRC idle state may contain information related to the verification result of the subscription information of the UE, and the information related to the verification result of subscription information of the UE may include, but is not limited to, CSG verification result information.

The CSG verification result information may include the CSG verification result information of a neighboring cell. CSG verification result information of a cell may include at least one of the following parameters of the cell: a Public Land Mobile Network (PLMN) ID, a cell ID, an access mode, a CSG ID or a membership status value (member/non-member).

The UE may determine a cell whose membership status value is "member" as the cell allowing access according to information of the neighboring cell as well as the PLMN ID, cell ID, CSG ID and membership status in the CSG verification result information.

If a UE is not a member of a CSG cell, the UE may not measure quality of this cell.

The CSG verification process may include a step described below.

For the UE having a CSG subscription attribute, after a random access procedure is completed, the base station reports CSG verification information of a cell to the MME, and the MME completes the CSG verification of the UE according to the reported CSG verification information of the cell and the subscription information of the UE acquired from a network side and obtains the CSG verification result information.

The CSG verification information of the cell may include CSG verification information of a neighboring cell. Verification information of a cell may include at least one of the following parameters of the cell: a PLMN ID, a cell ID, an access mode or a CSG ID.

After the MME completes the CSG verification, the MME may send the CSG verification result information to the base station via S1 interface signaling.

In this implementation scheme, the S110 may include: acquiring, by the UE, the CSG verification result information of the neighboring cell in any one of following manners.

The UE acquires the CSG verification result information from air interface signaling transmitted by the base station.

The UE acquires the CSG verification result information from a non-access stratum (NAS) message transmitted by the MME.

After the UE acquires the CSG verification result information, the UE may store the CSG verification result information as UE context information.

For an idle-state UE storing the CSG verification result information, this UE may determine a target cell range for cell quality measurement according to the CSG verification result information and complete cell reselection and subsequent cell access.

The target cell range for cell quality measurement may be determined in the following manner. The UE reads information of the neighboring cells in the system message broadcasted by the base station. The UE determines, according to the PLMN ID, cell ID, CSG ID and membership status in the stored CSG verification result information, a cell whose membership status value is "member" in the broadcasted neighboring cells (the broadcasted cells may also include the serving cell of the UE, but in the process of reselection, selection is only performed in the neighboring cells) as an ideal accessible cell and the target cell for cell quality measurement, and a cell whose membership status value is "non-member" in the broadcasted cells as a cell from which the UE can acquire limited services (such as the notification of earthquake, tsunami, etc.).

In this implementation scheme, before the S110, the method may further include a step described below.

The UE reports a locally stored count value corresponding to the CSG verification result information to the base station after accessing the base station.

The S110 may further include a step described below.

The UE receives a count value from the base station, and stores the count value as the count value corresponding to the CSG verification result information.

In this implementation scheme, the base station may report the count value to the MME, receive the CSG verification result information and a corresponding count value from the MME, transmit the count value to the UE, and determine whether to transmit the CSG verification result information to the UE according to an indication of the MME.

In this implementation scheme, when the count value reported by the UE is inconsistent with a count value of the UE locally maintained by the MME, the MME may complete CSG verification of the UE in the current cell and the neighboring cell, update the local count value, transmit the CSG verification result information of the UE and the updated count value to the base station, and instruct the base station to transmit the CSG verification result information of the UE and the updated count value to the UE. When the count value reported by the UE is consistent with the count value of the UE locally maintained by the MME, the MME may complete CSG verification of the UE in the current cell and the neighboring cell, transmit the CSG verification result information of the UE and the count value to the base station, and instruct the base station not to transmit the CSG verification result information to the UE.

Figure 2:
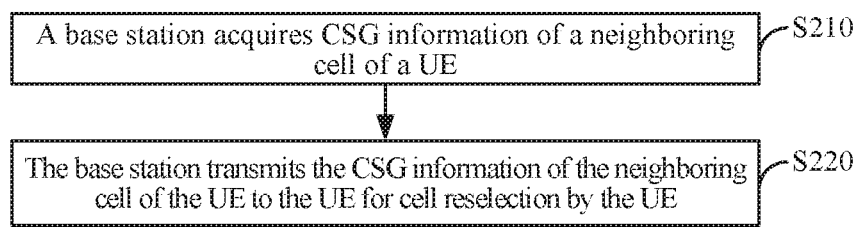
FIG. 2 is another optional processing flowchart of a cell reselection method according to an embodiment of the present disclosure.

Another optional processing procedure of the cell reselection method, as shown in FIG. 2, includes steps S210 and S220.

In step S210, a base station acquires CSG information of a neighboring cell of a UE.

In step S220, the base station transmits the CSG information of the neighboring cell of the UE to the UE for the UE to perform cell reselection.

In one implementation scheme, the CSG information of the neighboring cell may include CSG attribute information of the neighboring cell.

The base station may acquire CSG attribute information of a cell of another base station by interacting with another base station.

The step that the base station transmits the CSG information of the neighboring cell of the UE to the UE may include a step described below.

The base station broadcasts CSG attribute information of the neighboring cell of the UE.

The CSG attribute information of the neighboring cell may include one or more of:

a CSG indication or a CSG ID of each cell of intra-frequency neighboring cells, a PhysCellIdrange of the inter-frequency neighboring cell, or a CSG indication or a CSG ID of each cell of inter-frequency neighboring cells.

In one implementation scheme, the CSG information of the neighboring cell may include CSG verification result information of the neighboring cell.

The step that the base station acquires the CSG information of the neighboring cell of the UE may include steps described below.

The base station reports CSG verification information of the neighboring cell of the UE to an MME.

The base station acquires the CSG verification result information of the neighboring cell of the UE from the MME, where the CSG verification result information is acquired by the MME through completing CSG verification of the UE in the neighboring cell according to the CSG verification information reported by the base station and subscription information of the UE acquired from a network side.

The base station may also report CSG verification information of a serving cell of the UE, and acquire CSG verification result information of the serving cell of the UE from the MME, where the CSG verification result information of the serving cell of the UE is acquired by the MME through completing CSG verification of the UE in the serving cell according to the CSG verification information of the serving cell reported by the base station and the subscription information of the UE acquired from the network side.

CSG verification result information of a cell may include at least one of the following parameters of the cell:

a PLMN ID, a cell ID, an access mode, a CSG ID or a membership status value.

Verification information of a cell may include at least one of the following parameters of the cell: a PLMN identity, a cell identify, an access mode or a CSG identity.

In one implementation mode, before the base station transmits the CSG information of the neighboring cell of the UE to the UE, the method may include steps described below.

The base station transmits a count value reported by the UE and a count value corresponding to the CSG verification result information to the MME.

The base station receives the CSG verification result information and the corresponding count value from the MME, transmits the count value to the UE, and determines whether to transmit the CSG verification result information to the UE according to the indication of the MME.

In this implementation scheme, when the count value reported by the UE is inconsistent with a count value of the UE locally maintained by the MME, the MME may complete CSG verification of the UE in the current cell and the neighboring cell, update the local count value, transmit the CSG verification result information of the UE and the updated count value to the base station, and indicate the base station to transmit the CSG verification result information of the UE and the updated count value to the UE. When the count value reported by the UE is consistent with the count value of the UE locally maintained by the MME, the MME may complete CSG verification of the UE in the current cell and the neighboring cell, transmit the CSG verification result information of the UE and the count value to the base station, and indicate the base station not to transmit the CSG verification result information to the UE.

In one embodiment, when the method of this embodiment is applied to a legacy system, in radio resource control (RRC) connection resume or RRC resume, the step that the base station reports CSG verification information of the serving cell and the neighboring cell of the UE to the MME may include a step described below.

The base station reports the CSG verification information of the serving cell and the neighboring cell of the UE to the MME via a UE context resume request message.

The step that the base station acquires the CSG verification result information of the UE from the MME may include a step described below.

The base station acquires the CSG verification result information of the UE from a UE context resume response message transmitted by the MME.

The legacy system may include, but is not limited to, an M2M system or a narrowband Internet system.

Other implementation details of this embodiment may be found in an embodiment one.

Figure 3:
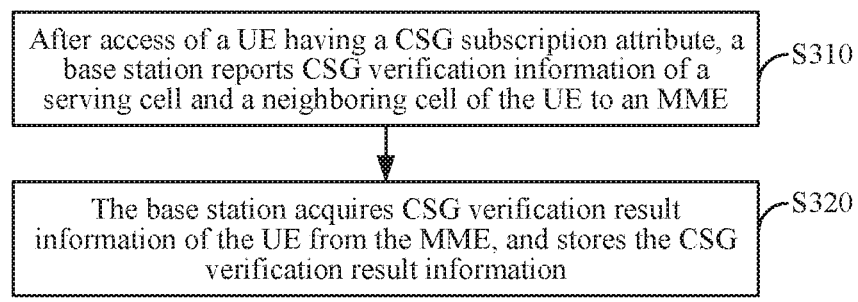
FIG. 3 is an optional processing flowchart of a CSG verification method according to an embodiment of the present disclosure.

An optional processing procedure of a CSG verification method, as shown in FIG. 3, includes steps S310 and S320.

In step S310, after access of a UE having a CSG subscription attribute, a base station reports CSG verification information of a serving cell and a neighboring cell of the UE to an MME.

In step S320, the base station acquires CSG verification result information of the UE from the MME, and stores the CSG verification result information, where the CSG verification result information is acquired by the MME through completing CSG verification of the UE in the serving cell and the neighboring cell according to the CSG verification information reported by the base station and subscription information of the UE acquired from a network side.

The UE may store UE context information, where the UE context information may include information of a verification result of subscription information of the UE.

The information of the verification result of subscription information of the UE may include, but is not limited to, CSG verification result information.

Verification result information of a cell may include at least one of the following parameters of the cell: a PLMN ID, a cell ID, an access mode, a CSG ID or a membership status.

The CSG verification process may include a step described below. For a UE having a CSG subscription attribute, after a random access procedure is completed, the base station reports CSG verification information of a cell to the MME, and the MME completes the CSG verification of the UE according to the reported CSG verification information of the cell and the subscription information of the UE acquired from the network side.

Verification information of a cell may include at least one of parameters of the cell: a PLMN ID, a cell ID, an access mode or a CSG ID.

The MME, after completing the CSG verification, may send the CSG verification result information of the UE to the base station via S1 interface signaling. The base station stores the CSG verification result information of the UE.

In one implementation scheme, after the S220, the method may further include a step described below.

When the UE meets a preset verification condition, the base station performs the CSG verification of the UE according to the stored CSG verification result information of the UE, or selects a target cell for the UE.

The base station may perform CSG verification for a UE in a specific scenario according to the stored CSG verification information of the UE and a current access mode.

The specific scenario may include at least one of: a scenario in which a UE in an RRC idle state performs RRC connection setup, a scenario in which a UE in an RRC idle state performs RRC connection resume, a scenario in which a UE in an RRC connected state performs RRC connection re-setup, or a scenario in which a UE in UE an RRC connected state performs handover.

The above embodiments will be described below through seven implementation examples. In the following seven implementation examples, the base station is described as an eNB.

The implementation example one includes a CSG verification process of a neighboring cell and transmission and storage of CSG verification result information in a process of RRC connection release triggered by the eNB.

Figure 4:
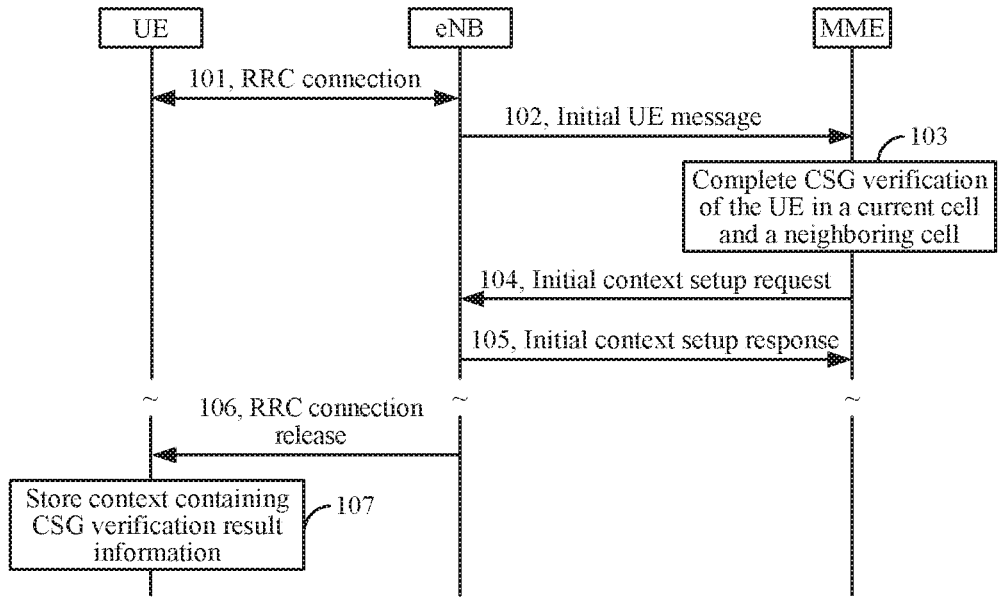
FIG. 4 is a flowchart of an implementation example one.

As shown in FIG. 4, this implementation example includes steps described below.

In step 101, RRC connection is performed between the UE and the eNB.

In step 102, after the RRC connection is completed, the eNB configures S1 interface signaling (for example, an initial UE message is adopted in this implementation example) to carry CSG verification information of a current cell and CSG verification information of a neighboring cell, where the CSG verification information of the neighboring cell may include: a cell ID of the neighboring cell, a corresponding CSG ID, and an access mode.

In step 103, the MME, after receiving the S1 interface signaling, performs CSG verification of the UE in the current cell and the neighboring cell, where an interface between the MME and the eNB is the S1 interface.

In step 104, the MME, after completing the verification, transmits CSG verification result information to the eNB via the S1 interface signaling (for example, an initial context setup request is adopted in this implementation example).

In step 105, the eNB transmits an initial context setup response to the MME.

In step 106, in the subsequent process, via an RRC connection release message triggered by the eNB, the eNB sends the CSG verification result information of the UE to the UE.

In step 107, the UE stores the CSG verification result information as the content of UE context information (UE context). In the CSG verification result information, a membership status includes: "member" and "non-member".

In this implementation example, the eNB triggers RRC connection release and sends the CSG verification result information to the UE via the RRC connection release message, such that the UE in the RRC idle state stores the UE context containing the CSG verification result information. The UE reads information of the current cell and the neighboring cells from the system message broadcasted by the eNB. According to the PLMN ID, cell ID, CSG ID and membership status in the stored CSG verification result information, the UE determines a cell whose membership status value is "member" in the broadcasted cells as an ideal accessible cell and the target cell for cell quality measurement, and determines a cell whose membership status value is "non-member" in the broadcasted cells as a cell from which the UE can acquire limited services (such as the notification of earthquake, tsunami, etc.).

In addition, for a UE under an unacknowledged mode (UM) supported by the RRC connection release message, in the RRC connection setup process, for example, the RRC connection setup complete message sends the UM support capability of the UE to the eNB or the UM support capability of the UE is sent to the eNB via dedicated capability information. When the eNB transmits the RRC connection release message, if the UE supports the UM manner, the eNB immediately releases the UE context after transmitting the RRC connection release message, without a necessity of waiting for the UE to acknowledge the transmission of the RRC connection release message before releasing the UE context. The UE supporting this capability does not need to transmit a feedback acknowledgement message for the receiving state of this RRC connection release message after receiving the RRC connection release message transmitted by the eNB.

The implementation example two contains a CSG verification process of a neighboring cell and transmission and storage of CSG verification result information in a process of RRC connect release triggered by an NAS message.

Figure 5:
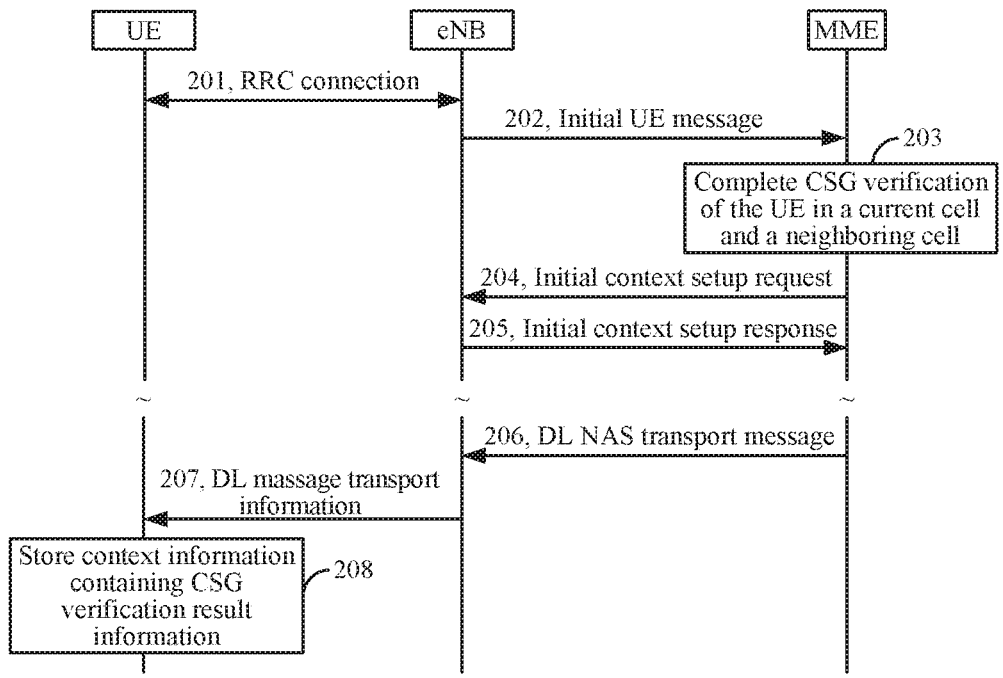
FIG. 5 is a flowchart of an implementation example two.

As shown in FIG. 5, this implementation example includes steps described below.

In step 201, RRC connection is performed between the UE and the eNB.

In step 202, after the RRC connection is completed, the eNB uses S1 interface signaling (for example, an initial UE message is adopted in this implementation example) to carry CSG verification information of a current cell and CSG verification information of a neighboring cell, where the CSG verification information of the neighboring cell may include: a cell ID of the neighboring cell, a corresponding CSG ID, and an access mode.

In step 203, the MME, after receiving the S1 interface signaling, performs CSG verification of the UE in the current cell and the neighboring cell.

In step 204, the MME, after completing the verification, transmits CSG verification result information to the eNB via the S1 interface signaling (for example, an initial context setup request is adopted in this implementation example).

In step 205, the eNB transmits an initial context setup response to the MME.

In step 206, in the subsequent process, in a RRC connection release process triggered by a core network, the MME places the CSG verification result information of the UE in an NAS protocol data unit (PDU), and transmits the CSG verification result information via a downlink (DL) NAS transport message to the eNB.

In step 207, the eNB sends the NAS PDU of the CSG verification result information via the DL NAS transport message to the UE.

In step 208, the UE stores the CSG verification result information as the content of UE context.

In this implementation example, the RRC connection release is triggered via the NAS message, and the CSG verification result information is sent to the UE in the NAS message, such that the UE in the RRC idle state stores the UE context containing the CSG verification result information. The UE reads information of the current cell and the neighboring cell in the system message broadcasted by the eNB. According to the PLMN ID, cell ID, CSG ID and membership status in the stored CSG verification result information, the UE determines a cell whose membership status value is "member" in the broadcasted cells as an ideal accessible cell and as the target cell for cell quality measurement, and determines a cell whose membership status value is "non-member" in the broadcasted cells as a cell from which the UE can acquire limited services (such as the notification of earthquake, tsunami, etc.).

The implementation example three contains transmission and storage of CSG verification result information of a UE in a state where RRC connection is suspended.

In this implementation example, the eNB sends the CSG verification result information of the UE to the UE in an RRC connection suspend process triggered by the eNB. For example, the CSG verification result information of the UE is sent to the UE in an RRC connection suspend message. The UE, after receiving the RRC connection suspend message, stores the CSG verification result information as the content of the UE context. The eNB also stores the UE context containing the CSG verification result information of the UE.

Figure 6:
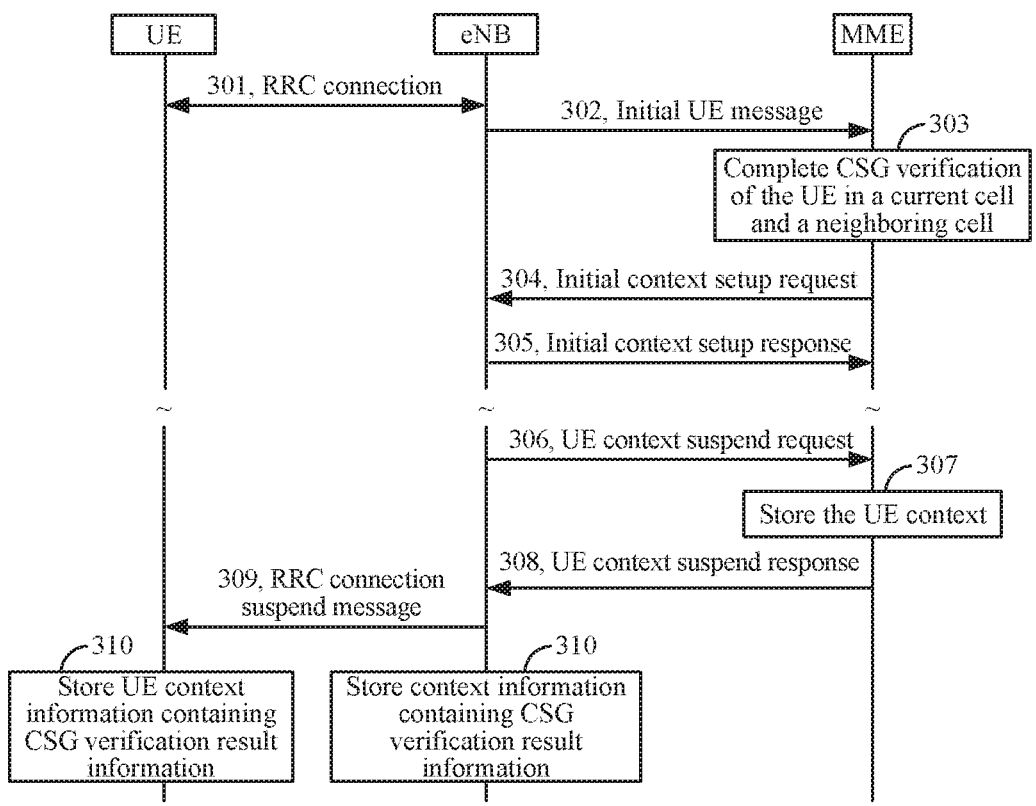
FIG. 6 is a flowchart of an implementation example three.

As shown in FIG. 6, this implementation example includes steps described below.

Steps 301 to 305 are the same as the steps 101 to 105, and details are not described here again.

In step 306, the eNB transmits a UE context suspend request to the MME.

In step 307, the MME stores the UE context.

In step 308, the MME transmits a UE context suspend response to the eNB.

In step 309, the eNB transmits the RRC connection suspend message to the UE.

In step 310, the UE stores the CSG verification result information as the content of UE context, and the eNB stores the UE context (containing the CSG verification result information of the UE).

The implementation example four contains a CSG verification method of a base station storing CSG verification result information in an RRC connection resume process initiated by the UE in a RRC idle state and a handover process of the UE in the RRC connected state.

Figure 7:
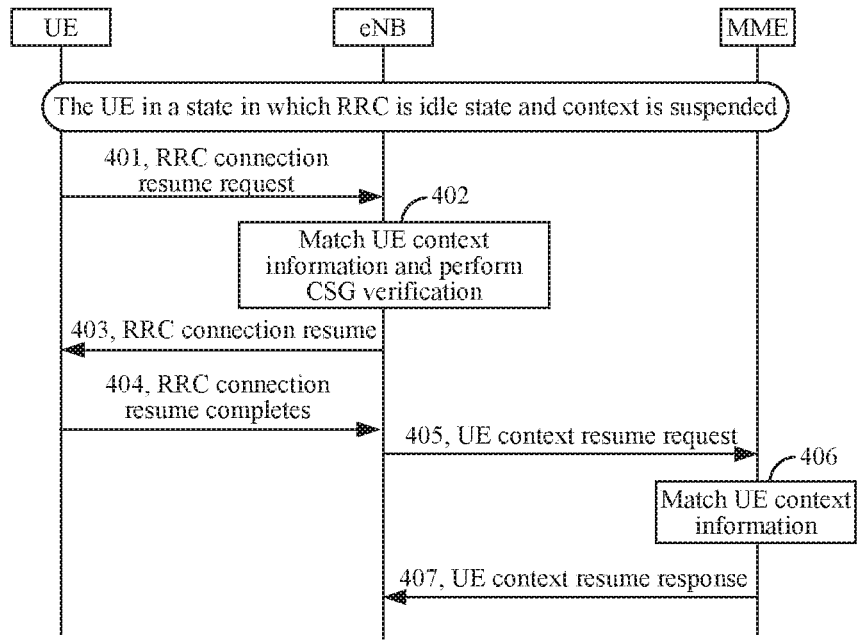
FIG. 7 is a flowchart of an implementation example four.

FIG. 7 shows CSG certification method of a UE in both an RRC idle state and a context suspend state in a RRC connection resume process. The CSG verification method includes steps described below.

In step 401, the UE transmits an RRC connection resume request message to the eNB, where the RRC connection resume request message carries UE context.

In step 402, for the UE in both the RRC idle state and the context suspend state, the eNB matches UE context reported by the UE according to the UE context stored by the eNB and performs CSG verification.

In step 403, if allowing access, the eNB transmits an RRC connection resume message to the UE.

In step 404, the UE transmits RRC connection resume complete message to the eNB.

In step 405, the eNB transmits a UE context resume request to the MME.

In step 406, the MME matches the UE context.

In step 407, the MME transmits a UE context resume response to the eNB.

It can be seen from the process described above that this implementation example carries related UE context used for the RRC connection resume in RRC connection resume signaling in the RRC connection resume process. The UE context carried in the RRC connection resume signaling may not contain CSG verification result information, and the eNB matches UE context after receiving an RRC connection resume request message carrying the UE context, and then performs CSG verification in this RRC connection resume process according to a latest access mode in conjunction with stored CSG verification result information of the UE.

If an access mode of CSG verification information stored previously is a hybrid mode, the CSG verification result is non-member, and the last time of accessing the cell is allowed; if an access mode of a cell is a close mode in this connection resume process, the CSG verification result is non-member, that is, this RRC connection resume process will be terminated. If the access mode of the cell is not the close mode, this cell allows access, and steps 403 to 407 described above are performed.

In this implementation example, for the UE in the RRC connected state, in the handover process, a source eNB stores UE context containing CSG verification result information and selects a target cell from among cells verified as CSG members of the UE according to the CSG verification result information.

The implementation example five optimizes CSG verification and the transmission of verification result information by setting CSG verification related counters on the UE side and MME side.

Figure 8:
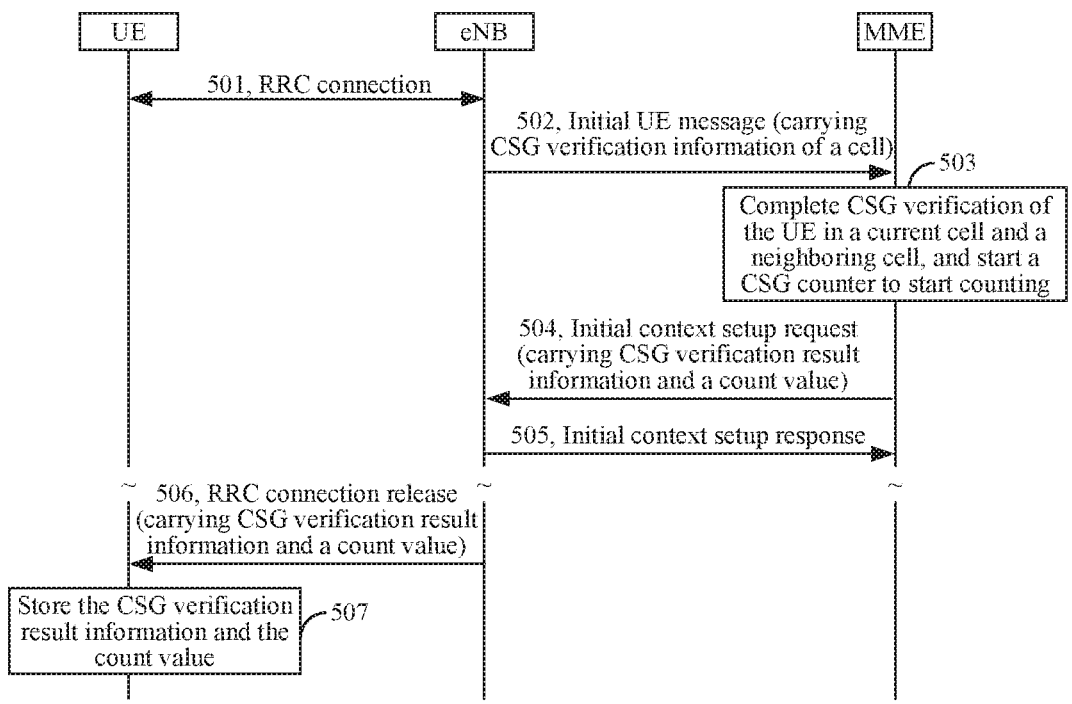
FIG. 8 is a flowchart of an implementation example five.

In this implementation example, the situation of the eNB acquires CSG verification result information for the first time is shown in FIG. 8, where steps 501 to 507 are basically the same as steps 101 to 107, and their differences are specifically contained in steps described below.

In step 503, the MME not only performs CSG verification of the UE in the current cell and neighboring cell, but starts the counter to start counting.

In step 504, the MME, after completing the verification, sends the CSG verification result information and the count value of the counter to the eNB via S1 interface signaling.

In step 506, besides the CSG verification result information of the UE, the eNB also sends a count value of the counter to the UE in the triggered RRC connection release message.

In step 507, the UE stores the CSG verification result information as the content of UE context, and stores the count value of the counter.

In this implementation example, CSG verification related counters are set on the UE side and MME side, where for each UE, the MME verifies a related count value separately for one CSG.

In this implementation example, the MME, after completing CSG verification of the UE, starts the counter and starts to count a number, for example, "1". The MME and the eNB transmit the CSG verification result information and a current count value of the counter in the MME at the same time. After RRC connection release, the UE in an idle state stores the CSG verification result information and starts the counter to record the received count value "1".

After the UE in the RRC idle state receives the system message broadcasted by the eNB, if the UE finds that neighboring list information and a neighboring list in the stored CSG verification result information change, the UE starts the counter to increase the store count value "1".

The implementation example six contains a situation that the UE subsequently accesses a network when CSG verification related counters are set on the UE side and the MME side.

Figure 9A:
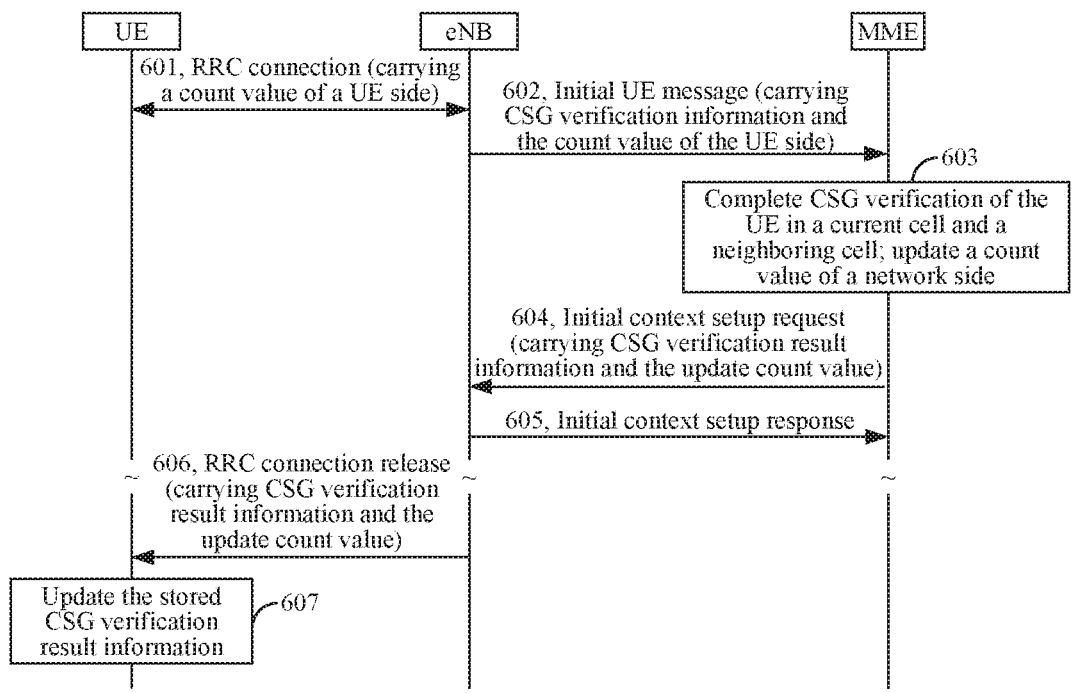
FIG. 9A is a flowchart of an implementation example six when count values are inconsistent.

The count value of the counter on the MME side is shown in FIG. 9A. In the process of subsequent access of the network, operations described below are performed.

In step 601, RRC connection is performed between the UE and the eNB, and in an RRC connection setup process, the UE sends the counter value on the UE side to the eNB, for example, in an RRC connection setup complete message.

In step 602, after the RRC connection is completed, the eNB sends the count value and CSG verification information to the MME via S1 interface signaling.

In step 603, the MME, after receiving the S1 interface signaling, performs CSG verification of the UE in the current cell and the neighboring cell, and compares the received count value with the stored count value. If the received count value with the stored count value are inconsistent, the MME, after completing CSG-related verification, updates the stored count value to obtain a counter update value.

In step 604, the MME, after completing the verification, sends the counter update value to the eNB while bringing CSG verification result information to the eNB via an initial context setup request, and indicates that the CSG verification result information and the counter update value need to be transmitted to the UE.

In step 605, the eNB transmits an initial context setup response to the MME.

In step 606, in an RRC connection release process, the eNB sends the CSG verification result information and the counter update value to the UE via an RRC connection release message.

In step 607, the UE updates the stored CSG verification result information.

Figure 9B:
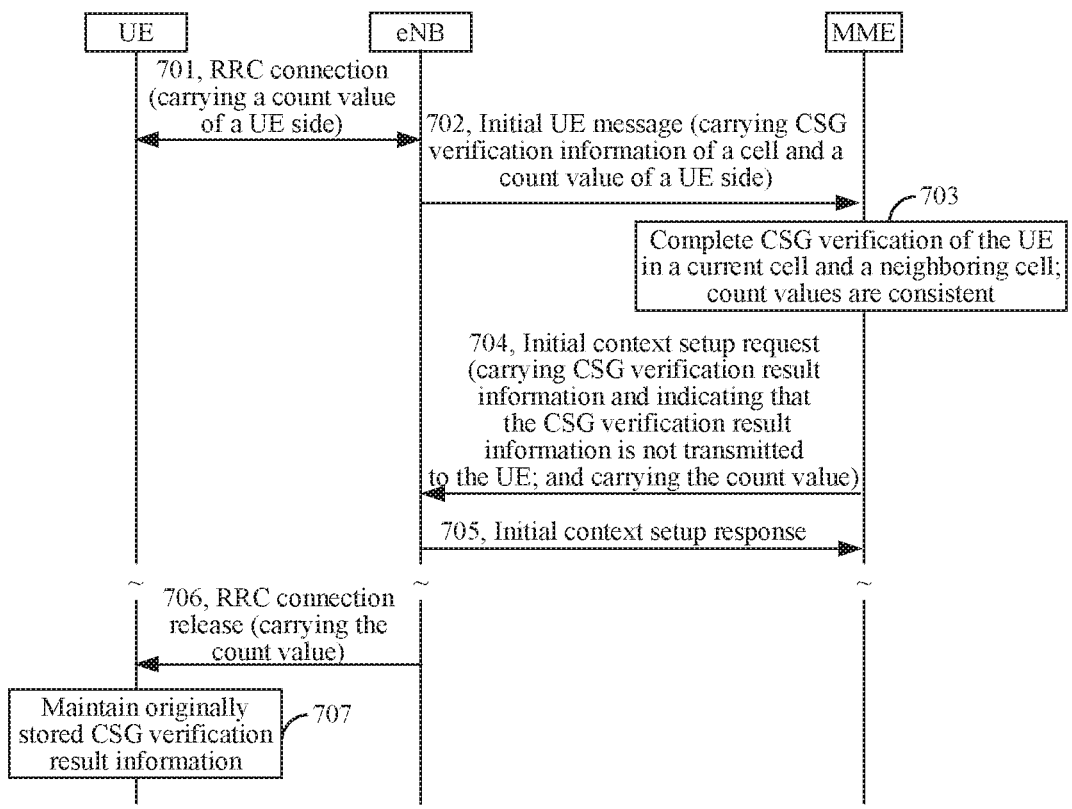
FIG. 9B is a flowchart of an implementation example seven when count values are consistent.

The count value of the counter on the UE side is shown in FIG. 9B, and operations in the subsequent network access process described below are performed.

In step 701, RRC connection is performed between the UE and the eNB, and in an RRC connection setup process, the UE sends the counter value to the eNB, for example, in an RRC connection setup complete message.

In step 702, after the RRC connection is completed, the eNB sends the count value and CSG verification information to the MME via S1 interface signaling.

In step 703, the MME, after receiving the S1 interface signaling, performs CSG verification of the UE in the current cell and the neighboring cell, compares the received count value with the stored count value and finds that the received count value and the stored count value are consistent.

In step 704, the MME, after completing the CSG-related verification, sends CSG verification result information and the count value of the network side to the eNB via an initial context setup request, and indicates that the CSG verification result information does not need to be transmitted to the UE.

In step 705, the eNB transmits an initial context setup response to the MME.

In step 706, in an RRC connection release process, the eNB sends the counter update value of the network side to the UE via an RRC connection release message.

In step 707, if the count value transmitted by the eNB is consistent with the count value of the UE side, the UE maintains the originally stored CSG verification result information.

The implementation example seven is used for illustrating how to introduce a CSG function for a system adopting a convention method or a new system.

For example, for a Narrow Band Internet of Things (NB-IoT) system of an M2M system, if a CSG function is introduced, for some processes shared by this system and an LTE system, a CSG verification method in the LTE may be adopted. But for specific processes of this NB-IoT system, such as the RRC connection resume process and the RRC resume process, the CSG verification process may be introduced. For example, CSG verification information (including a cell ID and a CSG ID) may be carried in the UE context resume request message; verification result information (including a CSG membership status) is sent to the eNB in the UE context resume response message, and the CSG verification may not be performed by the eNB.

The processing process of CSG function introduction for the new system may be analogized.

In an embodiment four, a cell reselection device is provided. The device includes a first processor and a first memory.

The first processor is configured to store first executable instructions which, when executed by the first processor, perform operations described below.

CSG information of a neighboring cell of a UE is acquired from a network side.

A cell to which the UE is allowed to access is determined according to the acquired CSG information of the neighboring cell.

The device of this embodiment may be set on the UE.

In one implementation scheme, the CSG information of the neighboring cell may include CSG attribute information of a neighboring cell broadcasted by a base station.

The step that the cell to which the UE is allowed to access is determined according to the acquired CSG information of the neighboring cell includes a step described below.

The cell allowing access is determined according to the acquired CSG attribute information of the neighboring cell and maintained CSG list information.

In this implementation scheme, the step that the cell allowing access is determined according to the acquired CSG attribute information of the neighboring cell and the maintained CSG list information may include a step described below.

If a CSG ID in the CSG attribute information of the neighboring cell exists in a CSG list maintained by the UE, the neighboring cell is determined as the cell allowing access.

In this implementation scheme, the CSG attribute information of the neighboring cell may include one or more of: a CSG indication or a CSG ID of each cell of intra-frequency neighboring cells, a CSG-PhysCellIdrange of the inter-frequency neighboring cell, or a CSG indication or a CSG ID of each cell of inter-frequency neighboring cells.

In one implementation scheme, the CSG information of the neighboring cell may include CSG verification result information of the neighboring cell, where the CSG verification result information of the neighboring cell is acquired by an MME through completing CSG verification of the UE in the neighboring cell according to CSG verification information reported by the base station and subscription information of the UE.

The cell to which the UE is allowed to access is determined according to the acquired CSG information of the neighboring cell in the following step.

The cell allowing access is determined according to the acquired CSG verification result information of the neighboring cell of the UE and information of the neighboring cell broadcasted by the base station.

In this implementation scheme, the first executable instructions, when executed by the first processor, may further perform an operation described below.

The CSG verification result information of the neighboring cell is stored in context information after the CSG information of the neighboring cell is acquired from the network side.

In this implementation scheme, CSG verification result information of a cell may include at least one of parameters of the cell:

a PLMN ID, a cell ID, an access mode, a CSG ID or a membership status value.

Verification information of a cell may include at least one of parameters of the cell: a PLMN ID, a cell ID, an access mode or a CSG ID.

In this implementation scheme, the operation that the CSG information of the neighboring cell is acquired from the network side may include a step described below.

A CSG verification result of the neighboring cell is acquired in one of following manners.

The CSG verification result information is acquired from air interface signaling transmitted by the base station.

Alternatively, the CSG verification result information is acquired from an NAS message transmitted by the MME.

In this implementation scheme, the first executable instructions, when executed by the first processor, may further perform an operation described below.

Before the CSG information of the neighboring cell is acquired from the network side, a locally stored count value corresponding to the CSG verification result information is reported to the base station after access of the UE.

The operation that the CSG information of the neighboring cell is acquired from the network side may further include a step described below.

The count value is received from the base station, and the count value is stored as a count value corresponding to the CSG verification result information.

Other details may be found in the embodiment one.

In an embodiment five, a cell reselection device is provided. The device includes a second processor and a second memory.

The second processor is configured to store second executable instructions which, when executed by the second processor, perform operations described below.

CSG information of a neighboring cell of a UE is acquired.

The CSG information of the neighboring cell of the UE is transmitted to the UE for the UE to perform cell selection.

The device of this embodiment may be set on the base station.

In one implementation scheme, the CSG information of the neighboring cell may include CSG attribute information of a neighboring cell.

The operation that the CSG information of the neighboring cell of the UE is transmitted to the UE may include a step described below.

CSG attribute information of the neighboring cell of the UE is broadcasted.

The CSG attribute information of the neighboring cell may include one or more of:

a CSG indication or a CSG ID of each cell of intra-frequency neighboring cells, a CSG-PhysCellIdrange of the inter-frequency neighboring cell, or a CSG indication or a CSG ID of each cell of inter-frequency neighboring cells.

In one implementation scheme, the CSG information of the neighboring cell may include CSG verification result information of a neighboring cell.

The operation that the CSG information of the neighboring cell of the UE is acquired may include steps described below.

CSG verification information of the neighboring cell of the UE is reported to an MME.

The CSG verification result information of the neighboring cell of the UE is acquired from the MME, where the CSG verification result information is acquired by the MME through CSG verification of the UE in the neighboring cell according to the reported CSG verification information and subscription information of the UE acquired from a network side.

In this implementation scheme, CSG verification result information of a cell may include at least one of parameters of the cell:

a PLMN ID, a cell ID, an access mode, a CSG ID or a membership status value.

Verification information of a cell may include at least one of the following parameters of the cell: a PLMN ID, a cell ID, an access mode or a CSG ID.

In this implementation scheme, the second executable instructions, when executed by the second processor, may further perform operations described below.

Before the CSG information of the neighboring cell of the UE is transmitted to the UE, a count value reported by the UE and a count value corresponding to the CSG verification result information are reported to the MME.

The CSG verification result information and the corresponding count value are received from the MME, the count value is transmitted to the UE, and whether to transmit the CSG verification result information to the UE is determined according to an indication of the MME.

Other details may be found in the embodiment two.

In an embodiment six, a CSG verification device is provided. The device includes a third processor and a third memory.

The third processor is configured to store third executable instructions which, when executed by the third processor, perform operations described below.

After access of a UE having a CSG subscription attribute, CSG verification information of a serving cell and a neighboring cell of the UE is reported to an MME.

CSG verification result information of the UE is acquired from the MME and is stored, where the CSG verification result information is acquired by the MME through completing CSG verification of the UE in the serving cell and the neighboring cell according to the CSG verification information reported by a base station and subscription information of the UE acquired from a network side.

The device of this embodiment may be set on the base station.

In one implementation scheme, CSG verification result information of a cell may include at least one of the following parameters of the cell:

a PLMN ID, a cell ID, an access mode, a CSG ID or a membership status value.

Verification information of a cell may include at least one of parameters of the cell: a PLMN identity, a cell identify, an access mode or a CSG identity.

In one implementation scheme, the third executable instructions, when executed by the third processor, may further perform an operation described below.

After the CSG verification result information of the UE is acquired from the MME and is stored, when the UE meets a preset verification condition, the CSG verification of the UE is performed according to the stored CSG verification result information of the UE, or a target cell is selected for the UE.

Other details may be found in the embodiment three.

Figure 10:
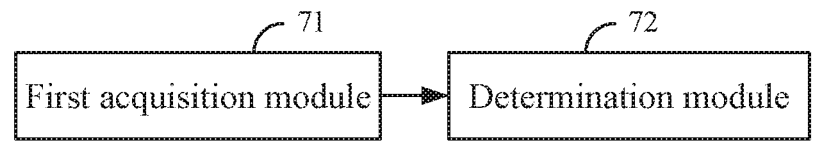
FIG. 10 is a schematic diagram of an optional structure of a cell reselection device according to an embodiment of the present disclosure.

An optional structure of a cell reselection device is shown in FIG. 10 and the cell reselection device includes a first acquisition module 71 and a determination module 72.

The first acquisition module 71 is configured to acquire CSG information of a neighboring cell of a UE from a network side.

The determination module 72 is configured to determine a cell to which the UE is allowed to access according to the acquired CSG information of the neighboring cell.

The device of this embodiment may be set on the UE.

In one implementation scheme, the CSG information of the neighboring cell may include CSG attribute information of the neighboring cell broadcasted by a base station.

Determining by the determination module the cell allowing access according to the acquired CSG information of the neighboring cell may include the following.

The determination module determines the cell allowing access according to the acquired CSG attribute information of the neighboring cell and maintained CSG list information.

In this implementation scheme, determining by the determination module the cell allowing access according to the acquired CSG attribute information of the neighboring cell and the maintained CSG list information may include the following step.

If a CSG ID in the CSG attribute information of the neighboring cell exists in a CSG list maintained by the UE, the determination module determines the neighboring cell as the cell allowing access.

In this implementation scheme, the CSG attribute information of the neighboring cell may include one or more of:

a CSG indication or a CSG ID of each cell of intra-frequency neighboring cells, a CSG-PhysCellIdrange of the inter-frequency neighboring cell, or a CSG indication or a CSG ID of each cell of inter-frequency neighboring cells.

In one implementation scheme, the CSG information of the neighboring cell may include CSG verification result information of the neighboring cell, where the CSG verification result information of the neighboring cell is acquired by an MME through completing CSG verification of the UE in the neighboring cell according to CSG verification information reported by the base station and subscription information of the UE.

Determining by the determination module the cell allowing access according to the acquired CSG information of the neighboring cell may include the following step.

The determination module determines the cell allowing access according to the acquired CSG verification result information of the neighboring cell of the UE and information of the neighboring cell broadcasted by the base station.

In one implementation scheme, the first acquisition module may further be configured to store the CSG verification result information of the neighboring cell in context information after the CSG information of the neighboring cell is acquired from the network side.

In this implementation scheme, CSG verification result information of a cell may include at least one of the following parameters of the cell:

a PLMN ID, a cell ID, an access mode, a CSG ID or a membership status value.

Verification information of a cell may include at least one of the following parameters of the cell: a PLMN ID, a cell ID, an access mode or a CSG ID.

In this implementation scheme, the first acquisition module acquires the CSG information of the neighboring cell from the network side as follows.

The first acquisition module acquires a CSG verification result of the neighboring cell in one of following manners.

The CSG verification result information is acquired from air interface signaling transmitted by the base station.

Alternatively, the CSG verification result information is acquired from an NAS message transmitted by the MME.

In this implementation scheme, the device of this embodiment may further include a count module.

The count module is configured to, before the CSG information of the neighboring cell is acquired from the network side, report a locally stored count value corresponding to the CSG verification result information to the base station after the UE accesses the base station.

The first acquisition module may further be configured to, when the CSG information of the neighboring cell of the UE is acquired from the network side, receive the count value from the base station, and store the count value as a count value corresponding to the CSG verification result information.

Other details may be found in the embodiment one.

Figure 11:
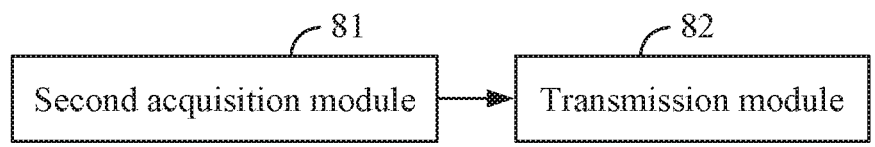
FIG. 11 is a schematic diagram of an optional structure of a cell reselection device according to an embodiment of the present disclosure.

An optional structure of a cell reselection device is shown in FIG. 11 and the cell reselection device includes a second acquisition module 81 and a transmission module 82.

The second acquisition module 81 is configured to acquire CSG information of a neighboring cell of a UE.

The transmission module 82 is configured to transmit the CSG information of the neighboring cell of the UE to the UE for cell selection by the UE.

The device of this embodiment may be set on the base station.

In one implementation scheme, the CSG information of the neighboring cell may include CSG attribute information of the neighboring cell.

Transmitting of the CSG information of the neighboring cell of the UE to the UE by the transmission module 82 may include the following step.

CSG attribute information of the neighboring cell of the UE is broadcasted.

The CSG attribute information of the neighboring cell may include one or more of:

a CSG indication or a CSG ID of each cell of intra-frequency neighboring cells, a CSG-PhysCellIdrange of the inter-frequency neighboring cell, or a CSG indication or a CSG ID of each cell of inter-frequency neighboring cells.

In one implementation scheme, the CSG information of the neighboring cell may include CSG verification result information of the neighboring cell.

Acquiring of the CSG information of the neighboring cell of the UE by the second acquisition module 81 may include the following step.

The second acquisition module 81 reports CSG verification result information of the neighboring cell of the UE to the MME, and acquires the CSG verification result information of the neighboring cell of the UE from the MME, where the CSG verification result information is acquired by the MME through completing CSG verification of the UE in the neighboring cell according to the reported CSG verification information and subscription information of the UE acquired from a network side.

In this implementation scheme, CSG verification result information of a cell may include at least one of the following parameters of the cell:

a PLMN ID, a cell ID, an access mode, a CSG ID or a membership status value.

Verification information of a cell may include at least one of the following parameters of the cell: a PLMN ID, a cell ID, an access mode or a CSG ID.

In this implementation scheme, the device of this embodiment may further include a count value transmission module.

The count value transmission module is configured to, before the CSG information of the neighboring cell of the UE is transmitted to the UE, transmit a count value reported by the UE and a count value corresponding to the CSG verification result information to the MME, receive the CSG verification result information and the corresponding count value from the MME, transmit the count value to the UE, and determine whether to transmit the CSG verification result information to the UE according to an indication of the MME.

Other details may be found in the embodiment two.

Figure 12:
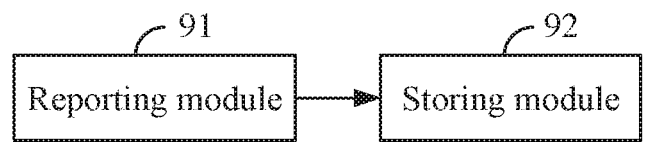
FIG. 12 is a schematic diagram of an optional structure of a CSG verification device according to an embodiment of the present disclosure.

An optional structure of a CSG verification device is shown in FIG. 12 and the CSG verification device includes a reporting module 91 and a storing module 92.

The reporting module 91 is configured to, after access of a UE having a CSG subscription attribute, report CSG verification information of a serving cell and a neighboring cell of the UE to an MME.

The storing module 92 is configured to acquire CSG verification result information of the UE from the MME, and store the CSG verification result information, where the CSG verification result information is acquired by the MME through CSG verification of the UE in the serving cell and the neighboring cell according to the CSG verification information reported by a base station and subscription information of the UE acquired from a network side.

The device of this embodiment may be set on the base station.

In one implementation scheme, CSG verification result information of a cell may include at least one of the following parameters of the cell:

a PLMN ID, a cell ID, an access mode, a CSG ID or a membership status value.

Verification information of a cell may include at least one of the following parameters of the cell: a PLMN identity, a cell identify, an access mode or a CSG identity.

In this implementation scheme, the device of this embodiment may further include a verification module.

After the storing module acquires the CSG verification result information of the UE from the MME and stores the CSG verification result information, when the UE meets a preset verification condition, the verification module performs the CSG verification of the UE according to the stored CSG verification result information of the UE, or selects a target cell for the UE.

Other details may be found in the embodiment three.

Figure 13:
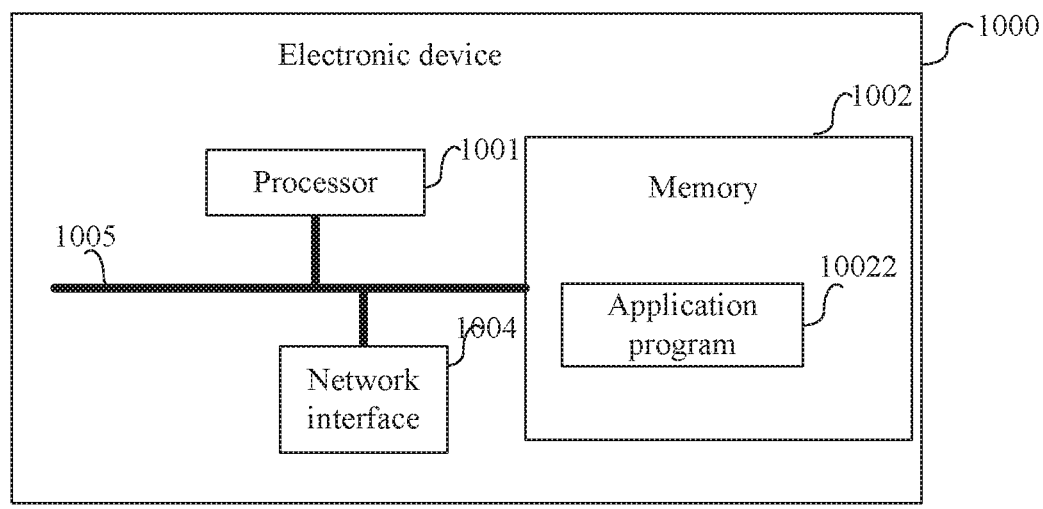
FIG. 13 is a schematic diagram of a hardware structure of an electronic device according to an embodiment of the present disclosure.

FIG. 13 is a schematic diagram of a hardware structure of an electronic device (a base station or a UE) according to an embodiment of the present disclosure. The electronic device 1000 includes at least one processor 1001, a memory 1002 and at least one network interface 1004. The memory 1002 stores application programs 10022. Various components in the electronic device 1000 are coupled together via a bus system 1005. It may be understood that the bus system 1005 is configured to implement connections and communications among these components. Besides a data bus, the bus system 1005 further includes a power bus, a control bus and a state signal bus. However, for the sake of clarity, various buses are all marked as the bus system 1005 in FIG. 13.

In an exemplary embodiment, an embodiment of the present disclosure further provides a computer-readable storage medium such as a memory including computer programs. The computer programs may be performed by a processor in the cell reselection device so as to implement steps of the cell reselection method described above or steps of the CSG verification method described above. The computer-readable storage medium may be a ferroelectric random access memory (FRAM), a read-only memory (ROM), a programmable read-only memory (PROM), an electrically programmable read-only memory (EPROM), an electrically erasable programmable read-only memory (EEPROM), a flash memory, a magnetic surface memory, an optical disk, a compact disc read-only memory (CD-ROM) or other memories, or may be any device including one or any combination of the memories described above, such as a mobile phone, a computer, a tablet device, a personal digital assistant, etc.

A computer-readable storage medium is provided. The computer-readable storage medium has computer programs stored thereon. The computer programs, when executed by a processor, perform steps of the cell reselection method or CSG verification method provided by the embodiments of the present disclosure.

Although the embodiments disclosed by the present application are as described above, the content thereof is merely embodiments for facilitating the understanding of the present application and is not intended to limit the present application. Any person skilled in the art to which the present application pertains may make any modifications and variations in the implementation forms and details without departing from the spirit and scope disclosed by the present application, but the patent protection scope of the present application is still subject to the scope defined by the appended claims.

What is claimed is:

1. A cell reselection method, comprising:
   receiving, by a user equipment (UE), closed subscriber group (CSG) verification result information of a neighboring cell from a network side; and
   determining, by the UE, a cell allowing access for the UE to perform cell reselection according to the received CSG verification result information of the neighboring cell;
   wherein the CSG verification result information of the neighboring cell is acquired by a mobility management entity (MME) through completing CSG verification of the UE in the neighboring cell according to CSG verification information of the neighboring cell of the UE reported by a base station and subscription information of the UE;
   wherein determining, by the UE, the cell allowing access for the UE to perform cell reselection according to the received CSG verification result information of the neighboring cell comprises:
   determining, by the UE, the cell allowing access for the UE to perform cell reselection according to the received CSG verification result information of the neighboring cell and information of the neighboring cell broadcasted by the base station; and
   wherein receiving, by the UE, the CSG verification result information of the neighboring cell from the network side comprises:
   the UE receives the CSG verification result information from a non-access stratum (NAS) message transmitted by the MME.

2. The cell reselection method of claim 1, wherein after the UE receives the CSG verification result information of the neighboring cell from the network side, the method further comprises:
   storing, by the UE, the CSG verification result information of the neighboring cell in context information.

3. The cell reselection method of claim 1, wherein the CSG verification result information of a cell comprises at least one of parameters of the cell:
   a public land mobile network (PLMN) identity, a cell identity, an access mode, a CSG identity or a membership status value;
   wherein the CSG verification information of a cell comprises at least one of parameters of the cell: a PLMN identity, a cell identity, an access mode or a CSG identity.

4. A closed subscriber group (CSG) verification method, comprising:
   after access of a user equipment (UE) having a CSG subscription attribute, reporting, by a base station, CSG verification information of a serving cell and a neighboring cell of the UE to a mobility management entity (MME); and
   acquiring, by the base station, CSG verification result information of the serving cell and the neighboring cell of the UE from the MME, and storing the CSG verification result information of the serving cell and the neighboring cell of the UE, wherein the CSG verification result information is acquired by the MME through completing CSG verification of the UE in the serving cell and the neighboring cell according to the CSG verification information reported by the base station and subscription information of the UE acquired from a network side;
   wherein the CSG verification result information of the neighboring cell of the UE is transmitted by the MME to the UE through a non-access stratum (NAS) message for cell reselection by the UE.

5. The method of claim 4, wherein the CSG verification result information of a cell comprises at least one of parameters of the cell:
   a public land mobile network (PLMN) identity, a cell identity, an access mode, a CSG identity or a membership status value;
   wherein the CSG verification information of a cell comprises at least one of parameters of the cell: a PLMN identity, a cell identity, an access mode or a CSG identity.

6. The method of claim 4, wherein after the base station acquires the CSG verification result information of the serving cell and the neighboring cell of the UE from the MME and stores the CSG verification result information of the serving cell and the neighboring cell of the UE, the method further comprises:
   when the UE meets a preset verification condition, performing, by the base station, the CSG verification of the UE according to the stored CSG verification result information of the serving cell and the neighboring cell of the UE, or selecting a target cell for the UE.

7. A cell reselection device, disposed in a user equipment (UE) and comprising a processor and a memory;
   wherein the processor is configured to store executable instructions which, when executed by the processor, perform a cell reselection method, wherein the cell reselection method comprises:

receiving closed subscriber group (CSG) verification result information of a neighboring cell from a network side; and determining a cell allowing access for the UE to perform cell reselection according to the received CSG verification result information of the neighboring cell;

wherein the CSG verification result information of the neighboring cell is acquired by a mobility management entity (MME) through completing CSG verification of the UE in the neighboring cell according to CSG verification information of the neighboring cell of the UE reported by a base station and subscription information of the UE;

wherein determining the cell allowing access for the UE to perform cell reselection according to the received CSG verification result information of the neighboring cell comprises:

determining the cell allowing access for the UE to perform cell reselection according to the received CSG verification result information of the neighboring cell and information of the neighboring cell broadcasted by the base station; and wherein receiving the CSG verification result information of the neighboring cell from the network side comprises:

receiving the CSG verification result information from a non-access stratum (NAS) message transmitted by the MME.

8. A closed subscriber group (CSG) verification device, comprising a processor and a memory;

wherein the processor is configured to store executable instructions which, when executed by the processor, perform the closed subscriber group (CSG) verification method of claim 4.

9. A non-transitory computer-readable storage medium, comprising stored programs, wherein the programs, when executed by a processor, perform the cell reselection method of claim 1.

* * * * *